(12) United States Patent
Ye et al.

(10) Patent No.: US 11,174,956 B2
(45) Date of Patent: Nov. 16, 2021

(54) REGULABLE PRESSURE RELIEF VALVE FOR A DRAFT BEER FRESH-KEEPING KEG

(71) Applicant: NINGBO MAJOR DRAFT BEER EQUIPMENT CO., LTD, Ningbo (CN)

(72) Inventors: Xiaoyang Ye, Ningbo (CN); Bangcai Luo, Ningbo (CN)

(73) Assignee: NINGBO MAJOR DRAFT BEER EQUIPMENT CO., LTD, Ningbo (CN)

( * ) Notice: Subject to any disclaimer, the term of this patent is extended or adjusted under 35 U.S.C. 154(b) by 152 days.

(21) Appl. No.: 16/567,375

(22) Filed: Sep. 11, 2019

(65) Prior Publication Data

US 2020/0088312 A1    Mar. 19, 2020

(30) Foreign Application Priority Data

Sep. 14, 2018  (CN) .......................... 201811073649.0
Sep. 14, 2018  (CN) .......................... 201821504463.1

(51) Int. Cl.
| | |
|---|---|
| *F16K 17/06* | (2006.01) |
| *F16K 17/04* | (2006.01) |
| *G05D 16/10* | (2006.01) |
| *B67D 1/00* | (2006.01) |
| *B67D 1/12* | (2006.01) |

(52) U.S. Cl.
CPC ............ *F16K 17/06* (2013.01); *F16K 17/044* (2013.01); *G05D 16/103* (2013.01); *G05D 16/107* (2019.01); *B67D 1/00* (2013.01); *B67D 1/125* (2013.01); *B67D 2001/0093* (2013.01)

(58) Field of Classification Search
CPC ................ G05D 16/103; G05D 16/107; Y10T 137/7808; Y10T 137/7827; F16K 17/06; F16K 17/044; B67D 1/00; B67D 1/125; B67D 2001/0822; B67D 2001/0093
USPC ....................................... 137/505.25, 505.43
See application file for complete search history.

(56) References Cited

U.S. PATENT DOCUMENTS

| | | | | |
|---|---|---|---|---|
| 3,094,141 A | * | 6/1963 | Maienknecht ..... | G05D 16/0655 137/505.25 |
| 3,706,477 A | * | 12/1972 | Stelzer ...................... | B60T 8/26 303/9.73 |
| 3,848,631 A | * | 11/1974 | Fallon ................... | F16K 31/363 137/505.11 |

(Continued)

*Primary Examiner* — William M McCalister
(74) *Attorney, Agent, or Firm* — Charles C. Achkar; Ostrolenk Faber LLP.

(57) ABSTRACT

The present invention discloses a regulable pressure relief valve for a draft beer fresh-keeping keg, comprising a valve body housing, a first compression spring, a mushroom-shaped ejector rod, a second compression spring and a pressure exerting block. Said first compression spring, ejector rod, second compression spring and pressure exerting block are coaxially distributed; the ejector rod comprises a retractable rod and a mushroom head; the first compression spring is put on the retractable rod and the two ends of the first compression spring is stressed between the bottom of the mushroom head and the valve body housing; the two ends of the second compression spring is stressed between the top of the mushroom head and the pressure exerting block; a pressure regulation at the top of the retractable rod is realized by exerting a pressure on the pressure exerting block and thus realize the pressure regulation function.

7 Claims, 1 Drawing Sheet

(56) References Cited

U.S. PATENT DOCUMENTS

| | | | | |
|---|---|---|---|---|
| 3,945,686 A | * | 3/1976 | Orzel | B60T 8/26 |
| | | | | 303/9.72 |
| 5,135,023 A | * | 8/1992 | Ross | F17C 13/025 |
| | | | | 137/505.11 |
| 5,307,834 A | * | 5/1994 | Tatarek-Gintowt | G05D 16/10 |
| | | | | 137/116.5 |
| 5,775,368 A | * | 7/1998 | Morino | B63C 11/2209 |
| | | | | 137/375 |
| 5,899,221 A | * | 5/1999 | Holt | G05D 16/109 |
| | | | | 137/116.5 |
| 2004/0221894 A1 | * | 11/2004 | Henley | G05D 16/103 |
| | | | | 137/505.25 |
| 2006/0157122 A1 | * | 7/2006 | Kawamura | G05D 16/103 |
| | | | | 137/613 |
| 2007/0193638 A1 | * | 8/2007 | Kwon | F16K 31/0658 |
| | | | | 137/613 |
| 2007/0209703 A1 | * | 9/2007 | Neumann | G05D 16/106 |
| | | | | 137/102 |
| 2009/0242043 A1 | * | 10/2009 | Lev | G05D 16/0619 |
| | | | | 137/505.25 |

* cited by examiner

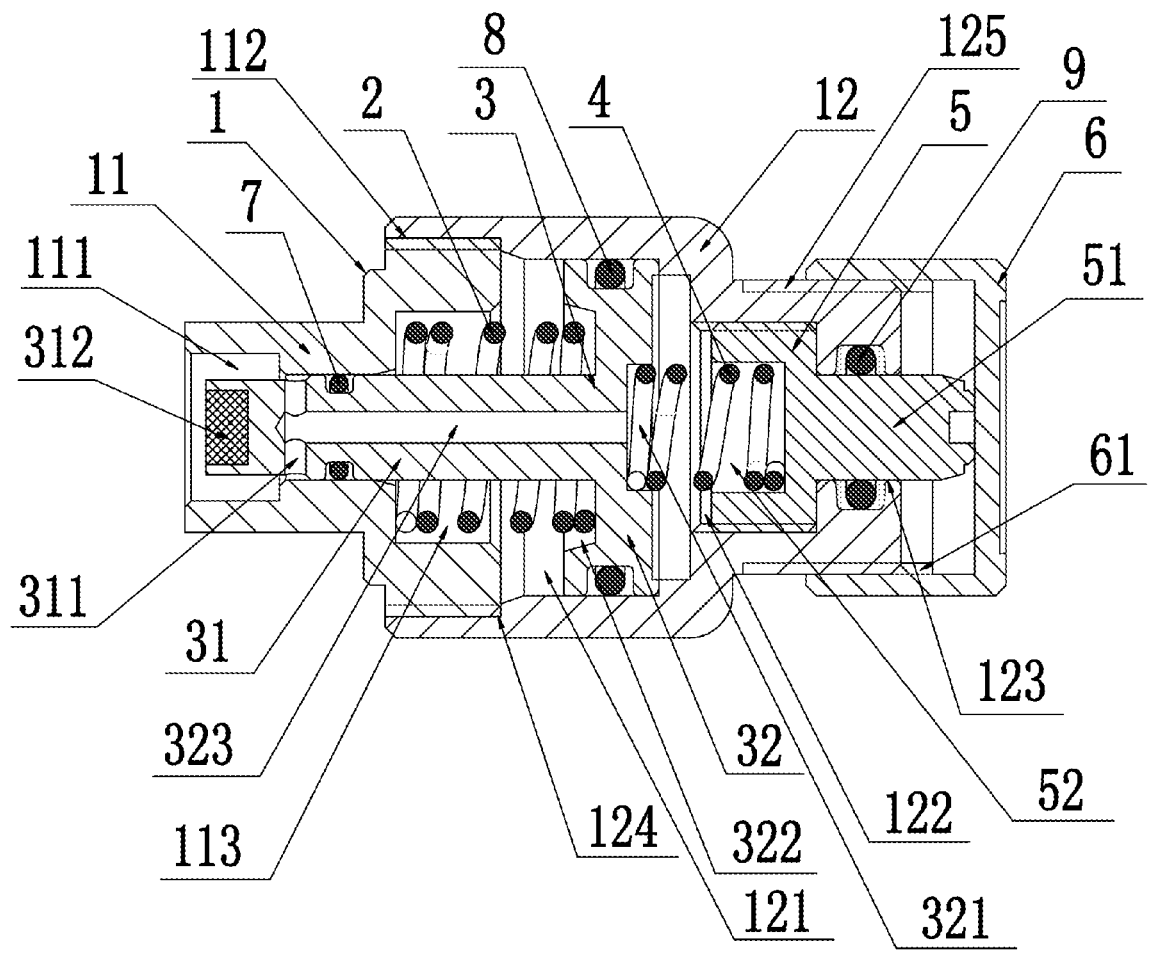

REGULABLE PRESSURE RELIEF VALVE FOR A DRAFT BEER FRESH-KEEPING KEG

CROSS REFERENCE TO RELATED APPLICATIONS

The present application claims priority to China Application No. 201811073649.0 filed on Sep. 14, 2018 and China Application No. 201821504463.1 filed Sep. 14, 2018, the subject matter of each of which are incorporated herein by reference in their entirety.

TECHNICAL FIELD

The present invention relates to the technical field of valve bodies, and in particular relates to a regulable pressure relief valve for a draft beer fresh-keeping keg.

BACKGROUND ART

The pressure relief valve is a valve which reduces the inlet pressure of a medium to the desired outlet pressure through a regulation and automatically keeps the outlet pressure stable by means of the energy of the medium.

From the viewpoint of fluid mechanics, the pressure relief valve is a throttling element whose local resistance can change. That is to say, by changing the throttling area, the velocity and kinetic energy of the fluid are changed to cause different pressure losses, and thus the purpose of reducing the pressure is achieved. Then, by means of regulations of the control and regulation system, a balance is achieved between the fluctuations of the downstream pressure and the spring force and the downstream pressure keeps constant within a certain error range. However, the stable pressure set for an ordinary pressure relief valve is constant and the ordinary pressure relief valve is not applicable to the equipment where the desired pressure varies. This greatly restricts the applicable scope of the ordinary pressure relief valve. The ordinary pressure relief valve is even not applicable to equipment where the desired pressure varies at any time. In addition, since the inlet and the outlet of the pressure relief valves commonly used nowadays are separated, it is very inconvenient to connect a pressure relief valve for the equipment whose high-pressure inlet and stable-pressure outlet are too close to each other.

SUMMARY OF THE INVENTION

(1) Technical Problem to be Solved

The technical problem to be solved by the present invention is to provide a simple, easy-to-operate and stable-pressure-regulable pressure relief valve for a draft beer fresh-keeping keg.

(2) Technical Solution

To solve the above-mentioned technical problem, the present invention provides a regulable pressure relief valve for a draft beer fresh-keeping keg, which comprises a valve body housing, a first compression spring, a mushroom-shaped ejector rod, a second compression spring and a pressure exerting block; the first compression spring, ejector rod, second compression spring and pressure exerting block are coaxially distributed from left to right in turn in the valve body housing; the ejector rod comprises a retractable rod and a mushroom head which are coaxially connected; the first compression spring is put on the retractable rod of the ejector rod and the force between the two ends of the first compression spring is applied between the bottom of the mushroom head and the valve body housing; the force between the two ends of the second compression spring is applied between the top of the mushroom head and the pressure exerting block;

a pressure is axially exerted on the pressure exerting block, the pressure acts on the second compression spring, and the acting force of the second compression spring overcomes the restoring force of the first compression spring to change the axial pressure of the ejector rod, that is to say, a pressure regulation at the top of the retractable rod is realized by exerting a pressure on the pressure exerting block.

Wherein, the valve body housing comprises a front housing and a rear housing; a through counterbore is opened at the front end of said front housing and the diameter of the smaller hole of said counterbore matches the outside diameter of the retractable rod; a mushroom head joint hole, a pressure exerting block joint hole and a pressure exerting hole coaxially communicating with each other are opened from front to back in turn in the rear housing, the diameter of the mushroom head joint hole matches the outside diameter of the mushroom head, the diameter of the pressure exerting block joint hole matches the outside diameter of the pressure exerting block, and the diameter of the pressure exerting hole is less than that of the pressure exerting block joint hole; a first threaded section coaxial with the counterbore is provided on the outer side of the rear end of the front housing, and a first threaded hole matching the first threaded section is provided at the front end of the mushroom head joint hole;

said front housing and rear housing realize a fixed connection through a matched threaded connection between the first thread section and the first threaded hole; the mushroom head of the ejector rod is put into the mushroom head joint hole and the retractable rod of the ejector rod is put into the smaller hole of the counterbore; the first compression spring is put on the retractable rod and arranged between the rear end face of the front housing and the bottom of the mushroom head; the pressure exerting block is put into the pressure exerting block joint hole; the second compression spring is provided between the top of the mushroom head and the pressure exerting block.

Wherein, an ejector column coaxial with the pressure exerting block is provided at the rear end of the pressure exerting block, the outside diameter of the ejector column matches the diameter of the pressure exerting hole, and the ejector column protrudes from the rear end of the rear housing;

the regulable pressure relief valve for a draft beer fresh-keeping keg further comprises a regulating knob, and a non-through second threaded hole is provided at the front end of the regulating knob; a second threaded section matching the second threaded hole is provided on the outer side of the rear end of the rear housing; the regulating knob realizes a fixed connection with the rear end of the rear housing through a threaded connection between the second threaded hole and second threaded section, and the bottom of the second threaded hole touches against the end of the ejector column.

Wherein, a first compression spring joint hole coaxial with the mushroom head and matching the second compression spring is opened at the top of the mushroom head, a second compression spring joint hole coaxial with the pressure exerting block and matching the second compression spring is opened at the front end of the pressure exerting block, and the two ends of the second compression spring are put into the first compression spring joint hole and the second compression spring joint hole, respectively.

Wherein, a third compression spring joint hole coaxially communicating with the counterbore and matching the first compression spring is opened on the rear end face of the front housing, an annular compression spring joint hole coaxial with the mushroom head and matching the first compression spring is opened at the bottom of the mushroom head, and the two ends of the first compression spring are put into the third compression spring joint hole and the annular compression spring joint hole, respectively.

Wherein, a first O-ring is provided between the smaller hole of the counterbore and the retractable rod; a second O-ring is provided between the mushroom head joint hole and the mushroom head; a third O-ring is provided between the pressure exerting hole and the ejector column.

Wherein, a radial side hole is opened on the side of the top of the retractable rod, the side hole communicates with the larger hole of the counterbore, and the side hole is provided before the first O-ring; a vent hole communicating with the side hole is opened at the top of the mushroom head of the ejector rod.

Wherein, a rubber block connected with the retractable rod is provided at the top of the retractable rod of the ejector rod.

(3) Advantageous Effects

Compared with the prior art, the present invention regulates the co-acting force between two springs through the pressure exerting block to regulate the pressure at the top of the ejector rod, and then achieves the function of regulating the stable pressure of the pressure relief valve, wherein the regulating knob is not only structurally simple, but also easy to operate since it can be turned and regulated through a threaded structure.

BRIEF DESCRIPTION OF THE DRAWING

FIG. 1 shows the structure of the regulable pressure relief valve for a draft beer fresh-keeping keg.

Description of reference numerals in the drawing: 1. valve body housing; 2. first compression spring; 3. ejector rod; 4. second compression spring; 5. pressure exerting block; 6. regulating knob; 7. first O-ring; 8. second O-ring; 9. third O-ring; 11. front housing; 12. rear housing; 31. retractable rod; 32. mushroom head; 51. ejector column; 52. second compression spring joint hole; 61. second threaded hole; 111. counterbore; 112. first threaded section; 113. third compression spring joint hole; 121. mushroom head joint hole; 122. pressure exerting block joint hole; 123. pressure exerting hole; 124. first threaded hole; 125. second threaded section; 311. side hole; 312. rubber block; 321. first compression spring joint hole; 322. annular compression spring joint hole; 323. vent hole

DETAILED DESCRIPTION OF THE INVENTION

The following further describes the present invention in detail in combination with the drawing and an embodiment. The following embodiment is used to describe the present invention, but not to restrict the scope of the present invention.

FIG. 1 shows the structure of the regulable pressure relief valve for a draft beer fresh-keeping keg in the present invention. The FIGURE mainly shows that the regulable pressure relief valve for a draft beer fresh-keeping keg comprises a valve body housing (1), a first compression spring (2), a mushroom-shaped ejector rod (3), a second compression spring (4) and a pressure exerting block (5), and the FIGURE also shows the connections between the components of the pressure relief valve and emphatically shows the regulating knob (6) matching the pressure exerting block (5).

As shown in FIG. 1, the regulable pressure relief valve for a draft beer fresh-keeping keg comprises a valve body housing (1), a first compression spring (2), a mushroom-shaped ejector rod (3), a second compression spring (4) and a pressure exerting block (5); the first compression spring (2), ejector rod (3), second compression spring (4) and pressure exerting block (5) are coaxially distributed from left to right in turn in the valve body housing (1); the ejector rod (3) comprises a retractable rod (31) and a mushroom head (32) which are coaxially connected; the first compression spring (2) is put on the retractable rod (31) of the ejector rod (3) and the force between the two ends of the first compression spring (2) is applied between the bottom of the mushroom head (32) and the pressure exerting block (5); the force between the two ends of the second compression spring (4) is applied between the top of the mushroom head (32) and the pressure exerting block (5); a pressure is axially exerted on the pressure exerting block (5), the pressure acts on the second compression spring (4), and the acting force of the second compression spring (4) overcomes the restoring force of the first compression spring (2) to change the axial pressure of the ejector rod (3), that is to say, a pressure regulation at the top of the retractable rod (31) is realized by exerting a pressure on the pressure exerting block (5). With the above-mentioned structure adopted in the present invention, the pressure at the top of the ejector rod can be regulated by exerting a pressure to regulate the co-acting force between the two compression springs, and thus the limit pressure of the pressure relief valve can be regulated.

As shown in FIG. 1, in the present embodiment, the valve body housing (1) comprises a front housing (11) and a rear housing (12); a through counterbore (111) is opened at the front end of the front housing (11) and the diameter of the smaller hole of the counterbore (111) matches the outside diameter of the retractable rod (31); a mushroom head joint hole (121), a pressure exerting block joint hole (122) and a pressure exerting hole (123) coaxially communicating with each other are opened from front to back in turn in the rear housing (11), the diameter of the mushroom head joint hole (121) matches the outside diameter of the mushroom head (32), the diameter of the pressure exerting block joint hole (122) matches the outside diameter of the pressure exerting block (5), and the diameter of the pressure exerting hole (123) is less than that of the pressure exerting block joint hole (122); a first threaded section (112) coaxial with the counterbore (111) is provided on the outer side of the rear end of the front housing (11), and a first threaded hole (124) matching the first threaded section (112) is provided at the front end of the mushroom head joint hole (121); said front housing (11) and rear housing (12) realize a fixed connection through a matched threaded connection between the first thread section (112) and the first threaded hole (124); the mushroom head (32) of the ejector rod (3) is put into the mushroom head joint hole (121) and the retractable rod (31) of the ejector rod (3) is put into the smaller hole of the counterbore (111); the first compression spring (2) is put on the retractable rod (31) and arranged between the rear end face of the front housing (11) and the bottom of the mushroom head (32); the pressure exerting block (5) is put into the pressure exerting block joint hole (122); the second compression spring (4) is provided between the top of the mushroom head (32) and the pressure exerting block (5). Wherein, the pressure inlet of the pressure relief valve is arranged at the top of the ejector rod, while the pressure outlet matches and communicates with the larger hole of the counterbore (111). Thus, the pressure inlet and the pressure outlet are arranged at the same place and the pressure relief valve is applicable to equipment where the pressure inlet and outlet are close to each other. In addition, a seal ring can be provided between the first threaded section (112) and the first threaded hole (124), or thread glue can be applied between the first threaded section (112) and the first threaded hole (124) to guarantee the sealing performance of the product.

As shown in FIG. 1, in the present embodiment, an ejector column (51) coaxial with the pressure exerting block is provided at the rear end of the pressure exerting block (5), the outside diameter of the ejector column (51) matches the diameter of the pressure exerting hole (123), and the ejector column (51) protrudes from the rear end of the rear housing (12); said regulable pressure relief valve for a draft beer fresh-keeping keg further comprises a regulating knob (6), and a non-through second threaded hole (61) is provided at the front end of the regulating knob (6); a second threaded section (125) matching the second threaded hole (61) is provided on the outer side of the rear end of the rear housing (12); the regulating knob (6) realizes a fixed connection with the rear end of the rear housing (12) through a matched threaded connection between the second threaded hole (61) and the second threaded section (125), and the bottom of the second threaded hole (61) touches against the end of the ejector column (51). With the above-mentioned structure adopted in the present invention, the axial displacement of the pressure exerting block (5) can be regulated through the regulating knob (6), the difference between the co-acting forces between the first compression spring (2) and the second compression spring (4) can be regulated, then the pressure on the top of the ejector rod (3) can be regulated, and thus the regulation of the pressure of the product is realized. In addition, pressure scales can be marked on the regulating knob (6) and the pressure scales can represent the pressures exerted on the top of the ejector rod (3). Wherein, when no regulating knob (6) is available, a threaded connected is directly adopted between the ejector column (51) and the pressure exerting hole (123), and thus the pressure of the regulable pressure relief valve can be regulated through the thread regulation of the ejector column (51). In addition, an integrated structure, or a detachable structure can be adopted between the ejector column (51) and the pressure exerting block (5).

As shown in FIG. 1, in the present embodiment, a first compression spring joint hole (321) coaxial with the mushroom head and matching the second compression spring (4) is opened at the top of the mushroom head (32), a second compression spring joint hole (52) coaxial with the pressure exerting block and matching the second compression spring (4) is opened at the front end of the pressure exerting block (5), and the two ends of the second compression spring (4) are put into the first compression spring joint hole (321) and the second compression spring joint hole (52), respectively. With the above-mentioned structure adopted in the present invention, the second compression spring (4) can effectively be restricted from deviating, thus guaranteeing the stability of the acting force of the second compression spring (4).

As shown in FIG. 1, in the present embodiment, a third compression spring joint hole (111) coaxially communicating with the counterbore (113) and matching the first compression spring (2) is opened on the rear end face of the front housing (11), an annular compression spring joint hole (322) coaxial with the mushroom head and matching the first compression spring (2) is opened at the bottom of the mushroom head (32), the two ends of the first compression spring are put into the third compression spring joint hole (113) and the annular compression spring joint hole (322), respectively. With the above-mentioned structure adopted in the present invention, not only the first compression spring (2) can be prevented from deviating, thus guaranteeing the stability of the first compression spring (2), but also the regulable pressure relief valve can be structurally more compact so that space is saved and the volume of the regulable pressure relief valve is reduced as much as possible while the performance is guaranteed.

As shown in FIG. 1, in the present embodiment, a first O-ring (7) is provided between the smaller hole of the counterbore (111) and the retractable rod (31), a second O-ring (8) is provided between the mushroom head joint hole (121) and the mushroom head (32), and a third O-ring (9) is provided between the pressure exerting hole (123) and the ejector column (51). The above-mentioned O-rings provided in the present invention can effectively guarantee the sealing performances in the regulable pressure relief valve.

As shown in FIG. 1, in the present embodiment, a radial side hole (311) is opened on the side of the top of the retractable rod (31), the side hole (311) communicates with the larger hole of the counterbore (111), and the side hole (311) is provided before the first O-ring (7), and a vent hole (323) communicating with the side hole (311) is opened at the top of the mushroom head (32) of the ejector rod (3). The above-mentioned side hole (311) and vent hole (323) provided in the present invention can guarantee the communication between the spaces at the larger hole of the counterbore (111) and the second compression spring (4), and can guarantee a stable and equal pressure at these two places, that is to say, the pressure at the pressure outlet is always consistent with the pressure at the second compression spring (4). Thus, a stable pressure at the pressure outlet of the product is realized. For example, the pressure at the top of the ejector rod (3) is regulated to x, the pressure at the pressure inlet at the top of the ejector rod (3) is F, and the pressure at the pressure outlet at the larger hole of the counterbore (111) and the pressure at the second compression spring (4) are both y. When F>x+y, the top of the ejector rod (3) is ejected by the pressure at the pressure inlet. In this case, the pressure at the pressure outlet at the larger hole of the counterbore (111) and the pressure at the second compression spring are both greater than y and become a stable pressure until they are both F−x. This is because when the pressure at the second compression spring (4) is greater than F−x, or when the sum of the pressure at the second compression spring (4) and the pressure at the top of the ejector rod (3) is greater than F, the top of the ejector rod (3) blocks the pressure inlet, and thus the pressure at the pressure outlet at the larger hole of the counterbore (111) can always be F−x. Thus, the regulable pressure relief valve can output a stable pressure. In addition, when F<x+y, the ejector rod (3) always blocks the pressure inlet and a pressure counter-flow can effectively be prevented.

As shown in FIG. 1, in the present embodiment, a rubber block (312) connected with the retractable rod is provided at the top of the retractable rod (31) of the ejector rod (3) to increase the sealing performance between the top of the ejector rod (3) and the pressure inlet.

Only a preferred embodiment of the present invention is described above. It should be noted that those skilled in the art can make improvements and modifications without departing from the technical principle of the present invention and these improvements and modifications should also fall within the scope of protection of the present invention.

What is claimed is:

1. A regulable pressure relief valve for a draft beer fresh-keeping keg, wherein said regulable pressure relief valve for a draft beer fresh-keeping keg comprises a valve body housing, a first compression spring, a mushroom-shaped ejector rod, a second compression spring and a pressure exerting block; said first compression spring, ejector rod, second compression spring and pressure exerting block are coaxially distributed from left to right in turn in the valve body housing; the ejector rod comprises a retractable rod and a mushroom head which are coaxially connected; the first compression spring is put on the retractable rod of the ejector rod and the force between the two ends of the first compression spring is applied between the bottom of the mushroom head and the valve body housing; the force between the two ends of the second compression spring is applied between the top of the mushroom head and the pressure exerting block;

a pressure is axially exerted on the pressure exerting block, the pressure acts on the second compression spring, and the acting force of the second compression spring overcomes the restoring force of the first compression spring to change the axial pressure of the ejector rod;

wherein said valve body housing comprises a front housing and a rear housing; a through counterbore is opened at the front end of said front housing and the diameter of a smaller hole of said counterbore matches the outside diameter of the retractable rod; a mushroom head joint hole, a pressure exerting block joint hole and a pressure exerting hole coaxially communicating with each other are opened from front to back in turn in the rear housing, the diameter of said mushroom head joint hole matches the outside diameter of the mushroom head, the diameter of said pressure exerting block joint hole matches the outside diameter of the pressure exerting block, and the diameter of said pressure exerting hole is less than that of the pressure exerting block joint hole; a first threaded section coaxial with the counterbore is provided on the outer side of the rear end of the front housing, and a first threaded hole matching the first threaded section is provided at the front end of the mushroom head joint hole;

said front housing and rear housing realize a fixed connection through a matched threaded connection between the first thread section and the first threaded hole; the mushroom head of said ejector rod is put into the mushroom head joint hole and the retractable rod of the ejector rod is put into the smaller hole of the counterbore; said first compression spring is put on the retractable rod and arranged between the rear end face of the front housing and the bottom of the mushroom head; said pressure exerting block is put into the pressure exerting block joint hole; said second compression spring is provided between the top of the mushroom head and the pressure exerting block.

2. The regulable pressure relief valve for a draft beer fresh-keeping keg as claimed in claim 1, wherein an ejector column coaxial with the pressure exerting block is further provided at the rear end of said pressure exerting block, the outside diameter of said ejector column matches the diameter of the pressure exerting hole, and the ejector column protrudes from the rear end of the rear housing;

said regulable pressure relief valve for a draft beer fresh-keeping keg further comprises a regulating knob, and a non-through second threaded hole is provided at the front end of said regulating knob; a second threaded section matching the second threaded hole is provided on the outer side of the rear end of said rear housing; the regulating knob realizes a fixed connection with the rear end of the rear housing through a matched threaded connection between the second threaded hole and second threaded section, and the bottom of the second threaded hole touches against the end of the ejector column.

3. The regulable pressure relief valve for a draft beer fresh-keeping keg as claimed in claim 2, wherein a first compression spring joint hole coaxial with the mushroom head and matching the second compression spring is opened at the top of said mushroom head, a second compression spring joint hole coaxial with the pressure exerting block and matching the second compression spring is opened at the front end of said pressure exerting block, and the two ends of said second compression spring are put into the first compression spring joint hole and the second compression spring joint hole, respectively.

4. The regulable pressure relief valve for a draft beer fresh-keeping keg as claimed in claim 2, wherein a third compression spring joint hole coaxially communicating with the counterbore and matching the first compression spring is opened on the rear end face of the front housing, an annular compression spring joint hole coaxial with the mushroom head and matching the first compression spring is opened at the bottom of said mushroom head, the two ends of said first compression spring are put into the third compression spring joint hole and the annular compression spring joint hole, respectively.

5. The regulable pressure relief valve for a draft beer fresh-keeping keg as claimed in claim 2, wherein a first O-ring is provided between the smaller hole of said counterbore and the retractable rod; a second O-ring is provided between said mushroom head joint hole and the mushroom head; a third O-ring is provided between said pressure exerting hole and the ejector column.

6. The regulable pressure relief valve for a draft beer fresh-keeping keg as claimed in claim 5, wherein a radial side hole is opened on the side of the top of said retractable rod, said side hole communicates with the larger hole of the counterbore, and the side hole is provided before the first O-ring; a vent hole communicating with the side hole is opened at the top of the mushroom head of said ejector rod.

7. The regulable pressure relief valve for a draft beer fresh-keeping keg as claimed in claim 6, wherein a rubber block connected with the retractable rod is provided at the top of the retractable rod of said ejector rod.

\* \* \* \* \*